(12) United States Patent
Choi

(10) Patent No.: US 10,700,481 B2
(45) Date of Patent: Jun. 30, 2020

(54) MAGNETIC CONNECTOR SYSTEM

(71) Applicant: NORTH INC., Kitchener (CA)

(72) Inventor: Jaehong Choi, Kitchener (CA)

(73) Assignee: North Inc., Kitchener, Ontario (CA)

( * ) Notice: Subject to any disclaimer, the term of this patent is extended or adjusted under 35 U.S.C. 154(b) by 0 days.

(21) Appl. No.: 16/216,502

(22) Filed: Dec. 11, 2018

(65) Prior Publication Data

US 2019/0190194 A1 Jun. 20, 2019

Related U.S. Application Data

(60) Provisional application No. 62/734,792, filed on Sep. 21, 2018, provisional application No. 62/608,385, filed on Dec. 20, 2017.

(51) Int. Cl.

| | |
|---|---|
| *H01R 11/30* | (2006.01) |
| *H01R 24/50* | (2011.01) |
| *H01R 33/94* | (2006.01) |
| *H01R 13/62* | (2006.01) |
| *G06F 3/01* | (2006.01) |
| *H01R 13/04* | (2006.01) |
| *H01R 13/15* | (2006.01) |
| *H01R 103/00* | (2006.01) |
| *H01R 39/64* | (2006.01) |
| *H01R 13/24* | (2006.01) |

(52) U.S. Cl.
CPC ............ *H01R 24/50* (2013.01); *G06F 3/014* (2013.01); *H01R 13/04* (2013.01); *H01R 13/15* (2013.01); *H01R 13/6205* (2013.01); *H01R 33/94* (2013.01); *H01R 11/30* (2013.01); *H01R 13/2421* (2013.01); *H01R 13/2442* (2013.01); *H01R 39/64* (2013.01); *H01R 2103/00* (2013.01); *H01R 2201/06* (2013.01)

(58) Field of Classification Search
CPC ........ H01R 11/30; H01R 13/04; H01R 13/15; H01R 13/2421; H01R 13/2442; H01R 13/6205; H01R 24/50; H01R 39/64; G06F 3/014
USPC ............................ 439/37–40, 129, 289, 950
See application file for complete search history.

(56) References Cited

U.S. PATENT DOCUMENTS

| | | | |
|---|---|---|---|
| 9,112,303 B2 * | 8/2015 | Zeliff | ................ H01R 13/6205 |
| 2012/0329338 A1 | 12/2012 | Umemura | |
| 2013/0260577 A1 | 10/2013 | Chen et al. | |
| 2013/0323941 A1 | 12/2013 | Zeliff et al. | |
| 2017/0346320 A1 | 11/2017 | Jeong et al. | |

* cited by examiner

*Primary Examiner* — Khiem M Nguyen

(74) *Attorney, Agent, or Firm* — Thomas Mahon

(57) ABSTRACT

A magnetic connector system includes a connector receptacle having a connector pin in coaxial arrangement with a magnetic ground return and a connector insert having a power contact in coaxial arrangement with a magnetic sleeve. A power and/or data connection is formed between the power contact and the connector pin when an end face of the magnetic ground return is magnetically latched to an end face of the magnetic sleeve.

23 Claims, 11 Drawing Sheets

MAGNETIC CONNECTOR SYSTEM

TECHNICAL FIELD

The present systems, devices, and methods generally relate to magnetic connectors and particularly relate to magnetic connectors for a wearable ring.

BACKGROUND

Electronic devices are commonplace throughout most of the world today. Advancements in integrated circuit technology have enabled the development of electronic devices that are sufficiently small and lightweight to be carried by the user. Such portable electronic devices may include on-board power supplies (such as batteries or other power storage systems) and may be wireless (i.e., designed to operate without any wire connections to other non-portable electronic systems). However, a small and lightweight electronic device may still be considered portable even if it includes a wire connection to a non-portable electronic system. For example, a microphone may be considered a portable electronic device whether it is operated wirelessly or through a wire connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, and the like. Examples of wearable electronic devices include digital wristwatches, electronic armbands, electronic rings, electronic ankle-bracelets or "anklets", head-mounted electronic display units, hearing aids, and so on.

Because they are worn on the body of the user, visible to others, and generally present for long periods of time, form factor (i.e., size, geometry, and appearance) is a major design consideration in wearable electronic devices.

SUMMARY

In one aspect, a magnetic connector system includes a connector receptacle having a first contact plane and a connector insert having a second contact plane. The connector receptacle includes a connector pin that is electrically conductive. The connector pin has a first pin face on the first contact plane, a second pin face in opposing relation to the first pin face, and an outer wall that extends between the first pin face and the second pin face. The connector receptacle further includes a magnetic ground return that is electrically conductive. The magnetic ground return is in coaxial arrangement with the connector pin. The magnetic ground return has a first ground return face, a second ground return face in opposing relation to the first ground return face, and an inner wall that extends between the first ground return face and the second ground return face. The inner wall of the magnetic ground return is radially opposed to and spaced apart from the outer wall of the connector pin by a first annular gap. The connector insert includes a magnetic sleeve that is electrically conductive. The magnetic sleeve has an end face on the second contact plane and a central opening. The end face of the magnetic sleeve magnetically latches onto the first ground return face when the second contact plane is positioned in opposing relation to the first contact plane. The connector insert further includes a power contact received in the central opening of the magnetic sleeve. The power contact is in coaxial arrangement with the magnetic sleeve and separated from the magnetic sleeve by a second annular gap. The power contact has a contact end to contact the first pin face of the connector pin when the end face of the magnetic sleeve is magnetically latched onto the first ground return face.

In at least one example, the first pin face has a circular geometry at the first contact plane, the first ground return has an annular geometry at the first contact plane, and the circular geometry of the first pin face and the annular geometry of the first ground return face are concentric.

In at least one example, the connector receptacle is rotationally symmetric at the first contact plane, and the connector insert is rotationally symmetric at the second contact plane.

In at least one example, the magnetic connector system further includes an electrical insulator disposed in the first annular gap between the connector pin and the magnetic ground return. The electrical insulator may be a conformable material that conformably engages both the inner wall of the magnetic ground return and the outer wall of the connector pin.

In at least one example, the magnetic ground return is comprised of a ferromagnetic material or is a magnet.

In at least one example, the contact end of the power contact may have a bullnose shape.

In at least one example, a diameter of the power contact at the second contact plane is smaller than a diameter of the connector pin at the first contact plane.

In at least one example, the magnetic connector system further includes an electrical insulator disposed in the second annular gap between the magnetic sleeve and the power contact.

In at least one example, the magnetic connector system further includes a spring arranged to apply a biasing force to the power contact. The biasing force maintains contact between the contact end and the first pin face when the end face of the magnetic sleeve is magnetically latched onto the first ground return face.

In at least one example, the first pin face is recessed relative to the first ground return face at an end of the connector receptacle proximate the first contact plane.

In at least one example, the power contact has a circular geometry at the second plane, the magnetic sleeve has an annular geometry at the second contact plane, and the circular geometry and annular geometry are concentric.

In at least one example, the magnetic sleeve is comprised of a ferromagnetic material or is a magnet.

In at least one example, the magnetic connector system further includes a dongle having a dongle housing. The connector insert is partially disposed in the dongle housing, and the end face of the magnetic sleeve and the contact end of the power contact are exposed at an outer surface of the dongle housing. The dongle housing may include a connection port dimensioned to receive a connector, where the connector insert is electrically coupled to the connection port. The magnetic connector system may further include a stand having an arm, and the dongle housing may be supported on the arm of the stand.

In another aspect, a connector receptacle for receiving power and/or data at an electronic device includes a connector pin that is electrically conductive. The conductive pin has a first pin face on a contact plane, a second pin face in opposing relation to the first pin face, and an outer wall that extends between the first pin face and the second pin face. The connector receptacle further includes a magnetic ground return that is electrically conductive. The magnetic ground return is in coaxial arrangement with the connector pin. The magnetic ground return has a first ground return face, a second ground return face in opposing relation to the first ground return face, and an inner wall that extends between the first ground return face and the second ground return face. The inner wall of the magnetic ground return is radially opposed to and spaced apart from the outer wall of the connector pin by an annular gap.

In at least one example, the first pin face has a circular geometry at the contact plane, the first ground return face has an annular geometry at the contact plane, and the circular geometry of the first pin face and the annular geometry of the first ground return face are concentric.

In at least one example, the connector receptacle is rotationally symmetric at the contact plane.

In at least one example, the connector receptacle may further include an electrical insulator disposed in the annular gap between the connector pin and the magnetic ground return. The electrical insulator may be a conformable material that conformably engages both the inner wall of the magnetic ground return and the outer wall of the connector pin.

In at least one example, the magnetic ground return is comprised of ferromagnetic material or is a magnet.

In another aspect, a connector insert to mate with a connector receptacle of an electronic device includes a magnetic sleeve that is electrically conductive. The magnetic sleeve has an end face at a contact plane and a central opening. The end face of the magnetic sleeve magnetically latches onto a magnetic ground return of the connector receptacle when the contact plane including the end face of the magnetic sleeve is positioned in opposing relation to a contact plane of the connector receptacle. The connector insert further includes a power contact received in the central opening of the magnetic sleeve. The power contact is in coaxial arrangement with the magnetic sleeve and separated from the magnetic sleeve by an annular gap. The power contact has a contact end to contact a connector pin of the connector receptacle when the end face of the magnetic sleeve is magnetically latched onto the magnetic ground return of the connector receptacle.

In at least one example, the connector insert is rotationally symmetric at the contact plane.

In at least one example, the contact end has a bullnose shape.

In at least one example, the connector insert may further include an electrical insulator disposed in the annular gap between the power contact and the magnetic sleeve.

In at least one example, the connector insert may further include a spring arranged to apply a biasing force to the power contact. The biasing force maintains contact between the contact end and the connector pin when the connector insert is mated with the connector receptacle.

In at least one example, the magnetic sleeve is comprised of a ferromagnetic material or is a magnet.

In at least one example, the connector insert is attached to a dongle.

In another aspect, a method for exchanging power and/or data between a first device and a second device includes positioning a first contact plane including a front pin face of an electrically conductive connector pin of a connector receptacle of the first device in opposing relation to a second contact plane including an end face of an electrically conductive magnetic sleeve of a connector insert of the second device, thereby causing the electrically conductive magnetic sleeve of the connector insert to magnetically latch onto an electrically conductive magnetic ground return of the connector receptacle, thereby forming an electrical contact between the electrically conductive connector pin of the connector receptacle and a power contact of the connector insert. The method includes connecting the second device to a source of power and/or data and transmitting the power and/or data between the first device and the second device through the electrical contact.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the implementations or embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations or embodiments.

Figure 1:
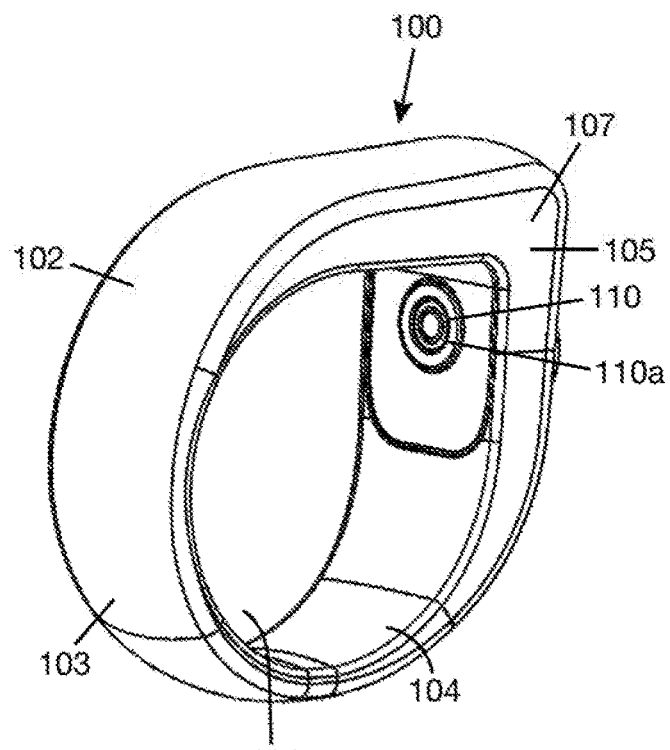
FIG. 1 is a rear perspective view of an electronic device with a connector receptacle.

FIG. 1 shows an electronic device 100 having a connector receptacle 110 through which power and/or data may be received. In FIG. 1, electronic device 100 is illustrated as a wearable electronic input device. In general, connector receptacle 110 may be integrated with any electronic device with a need to receive power and/or data from an external source, including, but not limited to, portable computing device, a tablet, a desktop computer, a smart phone, a storage device, a portable media player, a navigation system, a wearable device or any other such device that typically receives a signal via a cable connection. Connector receptacle 110 is mated with a connector insert (not shown) on another device, such as a dongle or power adapter, in order to allow power and/or data from the other device to be received by electronic device 100.

In the embodiment shown in FIG. 1, electronic device 100 is a wearable electronic input device having a body 102 designed and structured in a ring shape that can be worn by a person. For example, wearable electronic input device 100 may be a ring sized to be worn on a finger, such as an index finger, of a person. Further, wearable electronic input device 100 may be available in a variety of sizes for accommodating various finger sizes and/or various types of fingers. Electronic device body 102 has an outer surface 103 and an inner surface 104 and side surfaces 105, 106 (in FIG. 2). Generally, internal electronic components (not shown) are housed within body 102 in an enclosure defined by surfaces 103, 104, 105, 106. Inner surface 104 defines a cavity 101. A person can wear electronic device 100 by inserting a finger into cavity 101. The inner surface 104 thereby rests against the inserted finger of the person when the device 100 is worn by the person. Connector receptacle 110 is partially disposed in body 102 or mounted on inner surface 104. A front receptacle end 110a of connector receptacle 110 is disposed proximate the inner surface 104 of body 102 and thereby exposed to cavity 101.

Outer surface 103 and inner surface 104 generally have a similar shape such that body 102 is generally annular in shape and at least a portion of body 102 has a consistent thickness. In some embodiments, body 102 may have a corner portion 107. In some embodiments, corner portion 107 may provide support to body 102 about a finger as a user applies force to outer surface 103 of body 102. In some embodiments, corner portion 107 may provide additional space between outer surface 103 and inner surface 104 to house the internal electronic components of device 100. Body 102 may be made of any suitable durable material, e.g., a polymer material, a ceramic material, a blend thereof, or other known material for housing electrical components in an electronic device.

Figure 2:
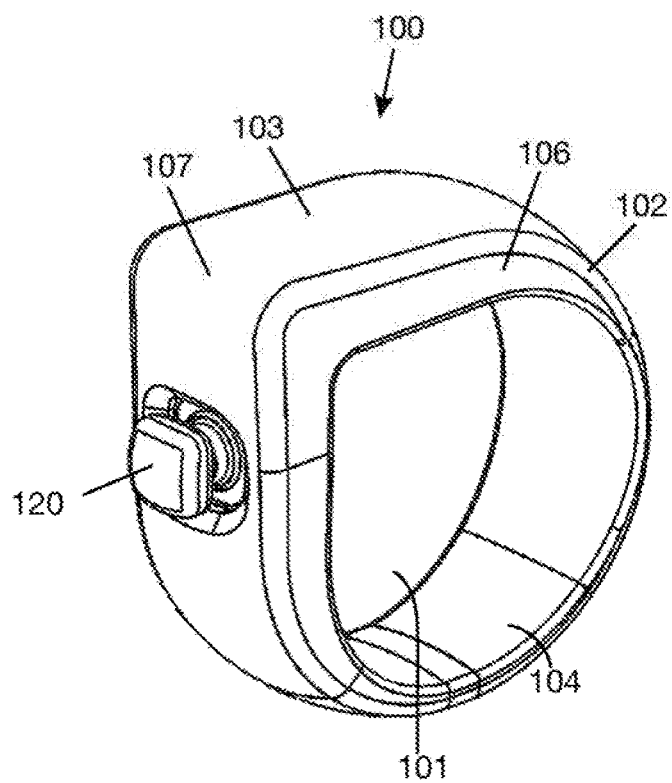
FIG. 2 is a front perspective view of the electronic device of FIG. 1.

Electronic device 100 may include input devices for the electronic device 100 to receive inputs from a user. For example, FIG. 2 shows body 102 of electronic device 100 carrying a joystick 120 for receiving inputs from a user. In one embodiment, when electronic device 100 is worn on the finger of the user, the joystick 120 can be manipulated by the user (e.g., with another finger or a thumb) to provide inputs to the device 100. In the embodiment shown in FIGS. 1 and 2, connector receptacle 110 (in FIG. 1) is generally on the opposite side of joystick 120 (in FIG. 2). Both connector receptacle 110 and joystick 120 may be proximate to the corner portion 107 of body 102.

Figure 3A:
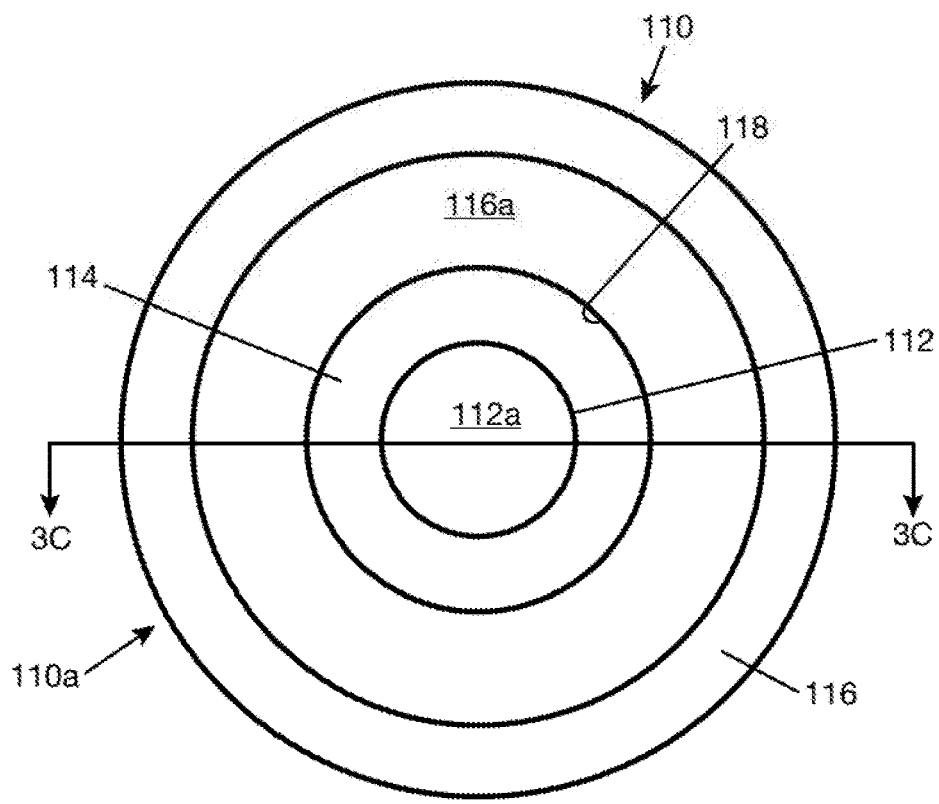
FIG. 3A is a front plan view of the connector receptacle of FIG. 1.
Figure 3B:
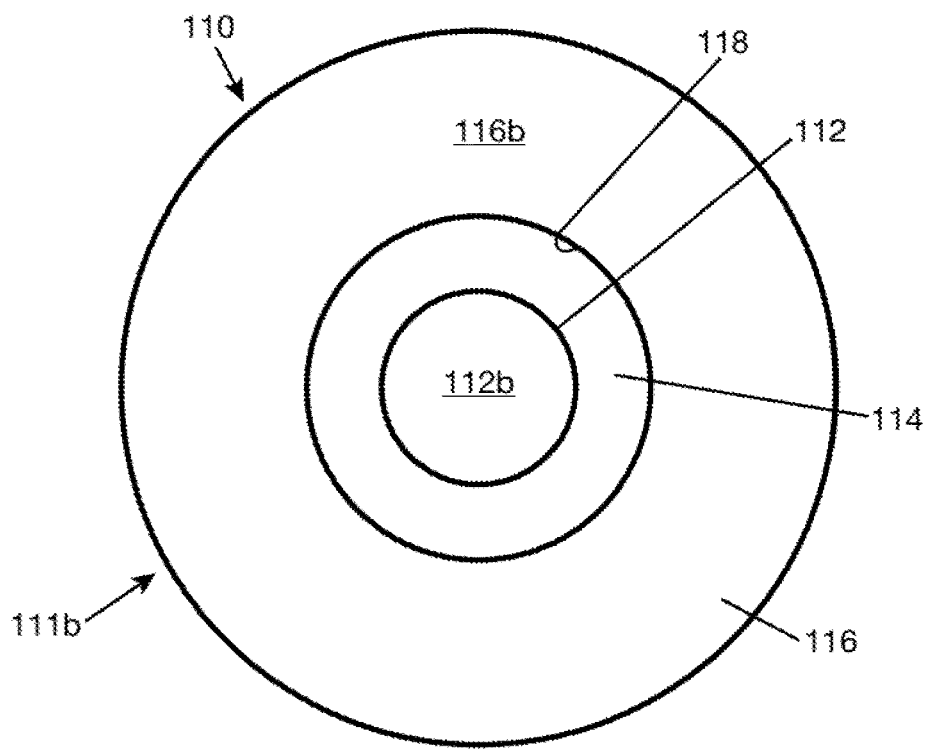
FIG. 3B is a rear plan view of the connector receptacle of FIG. 3A.
Figure 3C:
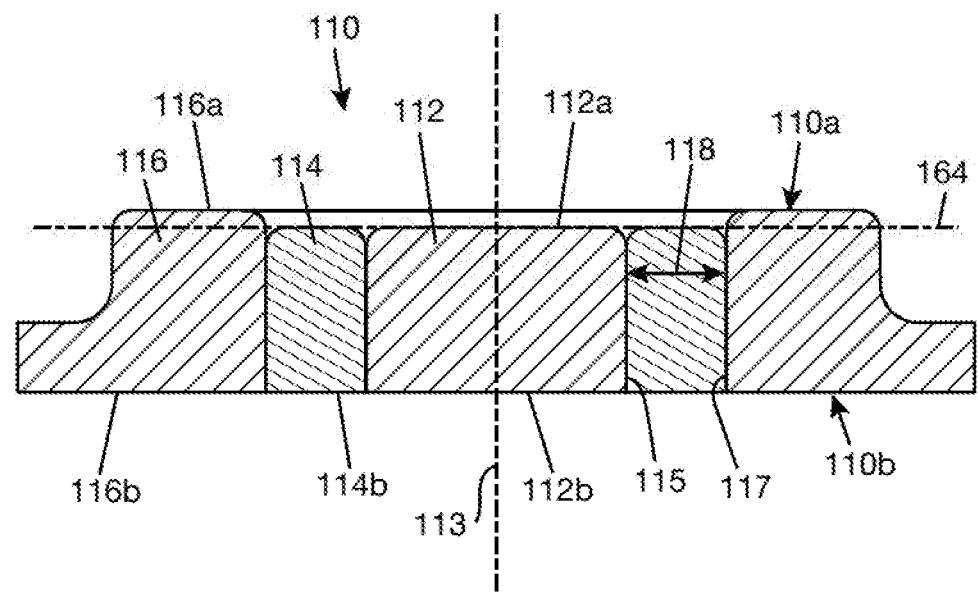
FIG. 3C is a cross-sectional view of the connector receptacle of FIG. 3A along line 3C-3C.

Referring to FIGS. 3A-3C, connector receptacle 110 has a connector pin 112 substantially surrounded by a magnetic ground return 116. Connector pin 112 is generally a power contact centrally positioned within and surrounded by magnetic ground return 116. Connector pin 112 has a front pin face 112a at front receptacle end 110a of connector receptacle 110, a back pin face 112b at a back receptacle end 110b of connector receptacle 110, and an outer wall 115 (in FIG. 3C) that extends between the front pin face 112a and the back pin face 112b. Front pin face 112a may be circular in shape, and connector pin 112 may have a generally cylindrical shape. Front pin face 112a provides a surface for contacting a power contact of a connector insert (not shown), which may be carried by a power adapter or similar device. In one example, connector pin 112 receives power from a power adapter or similar device (not shown) through front pin face 112a, carries current provided by the power adapter or similar device, and provides power to an electronic device, such as electronic device 100 in FIG. 1, through back pin face 112b. Connector pin 112 is made of a conductive material. Connector pin 112 may be made relatively small (in height and diameter) by using a material having high conductivity, such as brass, a copper-nickel-silicon alloy, a silver alloy, or the like.

Magnetic ground return 116 has a front ground return face 116a at front receptacle end 110a of connector receptacle 110, a back ground return face 116b at back receptacle end 110b of connector receptacle 110, and an inner wall 117 (in FIG. 3C) that extends between the front ground return face 116a and the back ground return face 116b. Front ground return face 116a may have a circular or annular geometry, and ground return 116 may have a circular or annular cross-section. Front ground return face 116a contacts a magnetic sleeve of a corresponding connector insert (not shown) when connector receptacle 110 mates with the connector insert. Front ground return face 116a may be planar or slightly curved to releasably couple with the magnetic sleeve of the corresponding connector insert. Front receptacle end 110a of connector receptacle 110 includes front ground return face 116a and front pin face 112a. Front pin face 112a may be recessed relative to front ground return face 116a at front receptacle end 110a of connector receptacle 110 (see FIG. 3C).

Magnetic ground return 116 forms a portion of a ground path of the connection system. Ground return 116 may be a magnet to attract a magnetic surface of the connector insert, or may be a ferromagnetic material to be attracted to a magnet of the connector insert, to facilitate coupling of connector receptacle 110 to the connector insert. To avoid shunting the resulting magnetic field, ground return 116 may be formed of a relatively low conductivity material, e.g., relatively low conductivity material compared to the material of the connector pin 112. Also, in order to maintain a strong magnetic field between ground return 116 and a magnetic sleeve of the connector insert, ground return 116 may be made relatively thin. To compensate for ground return 116 being formed of a thin, low-conductivity material, ground return 116 may be made relatively wide. This provides a larger surface to form a magnetic latch between magnetic ground return 116 and a magnetic sleeve of the connector insert while providing an adequate ground return path. In one example, ground return 116 may be a ferromagnetic material, such as low carbon steel (1010), titanium copper, silver alloy, stainless or other steel, or other appropriate material. In another example, ground return 116 may be a magnet made of, for example, a low carbon steel, a magnetic stainless steel, a ferromagnetic material, or other appropriate material.

Inner wall 117 of ground return 116 is radially opposed to and spaced apart from outer wall 115 of connector pin 112 by an annular gap 118. An insulator 114 is disposed in annular gap 118 to electrically isolate connector pin 112 from ground return 116. Insulator 114 is generally an electrically non-conductive material to electrically insulate connector pin 112 from ground return 116. In one example, insulator 114 may be a conformable material, such as plastic, and may be press-fitted between connector pin 112 and ground return 116 such that insulator 114 engages both inner wall 117 and outer wall 115. In another example, the insulator 114 may be air, i.e., connector pin 112 is isolated from magnetic ground return 116 by an air gap.

Figure 3D:
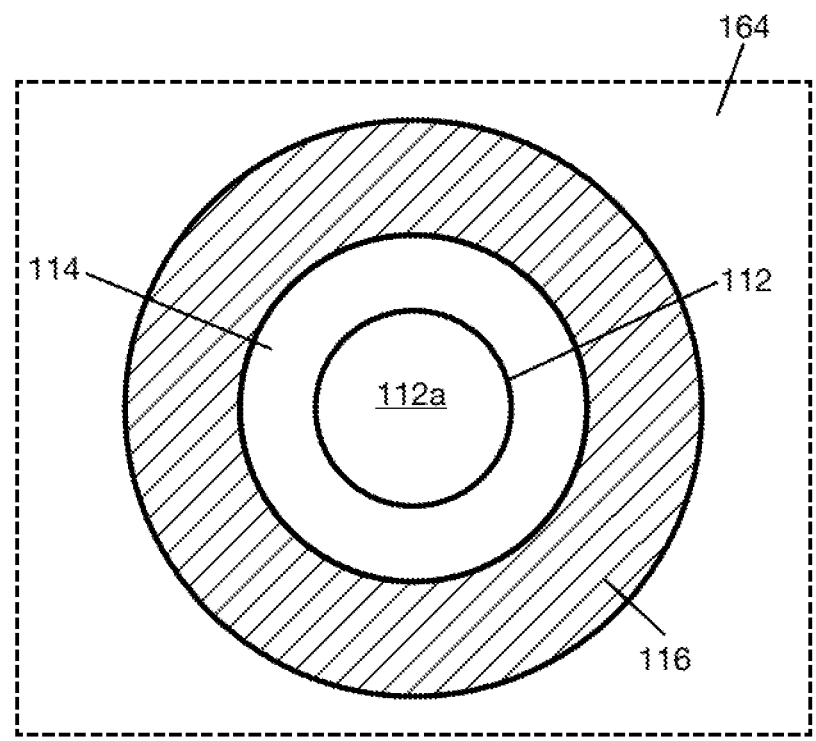
FIG. 3D is a cross-sectional view of the connector receptacle of FIG. 3C along plane 164.

In one implementation, connector receptacle 110 is rotationally symmetric (or radially symmetric). In general, this means that at a contact plane 164 (in FIGS. 3C and 3D) of connector receptacle including front pin face 112a, ground return 116 has an annular geometry, connector pin 112 has a circular geometry, and these annular and circular geometries are concentric (see FIG. 3D). In general, this also means that connector pin 112 is coaxial with ground return 116, i.e., connector pin 112 and ground return 116 share a common axial axis 113 (in FIG. 3C). A connector insert with a similar rotational symmetry (or radial symmetry) at a contact plane can be mated with connector receptacle 110. The rotational symmetry allows a connection between connector receptacle 110 and the connector insert to be made by simply bringing the contact plane 164 of connector receptacle 110 in opposing relation to the contact plane of the connector insert, and within a distance in which the magnetic components of the connector receptacle and connector insert can be attracted to each other, without any regard for rotational offsets between the contact planes of the connector receptacle 110 and the connector insert.

Figure 3E:
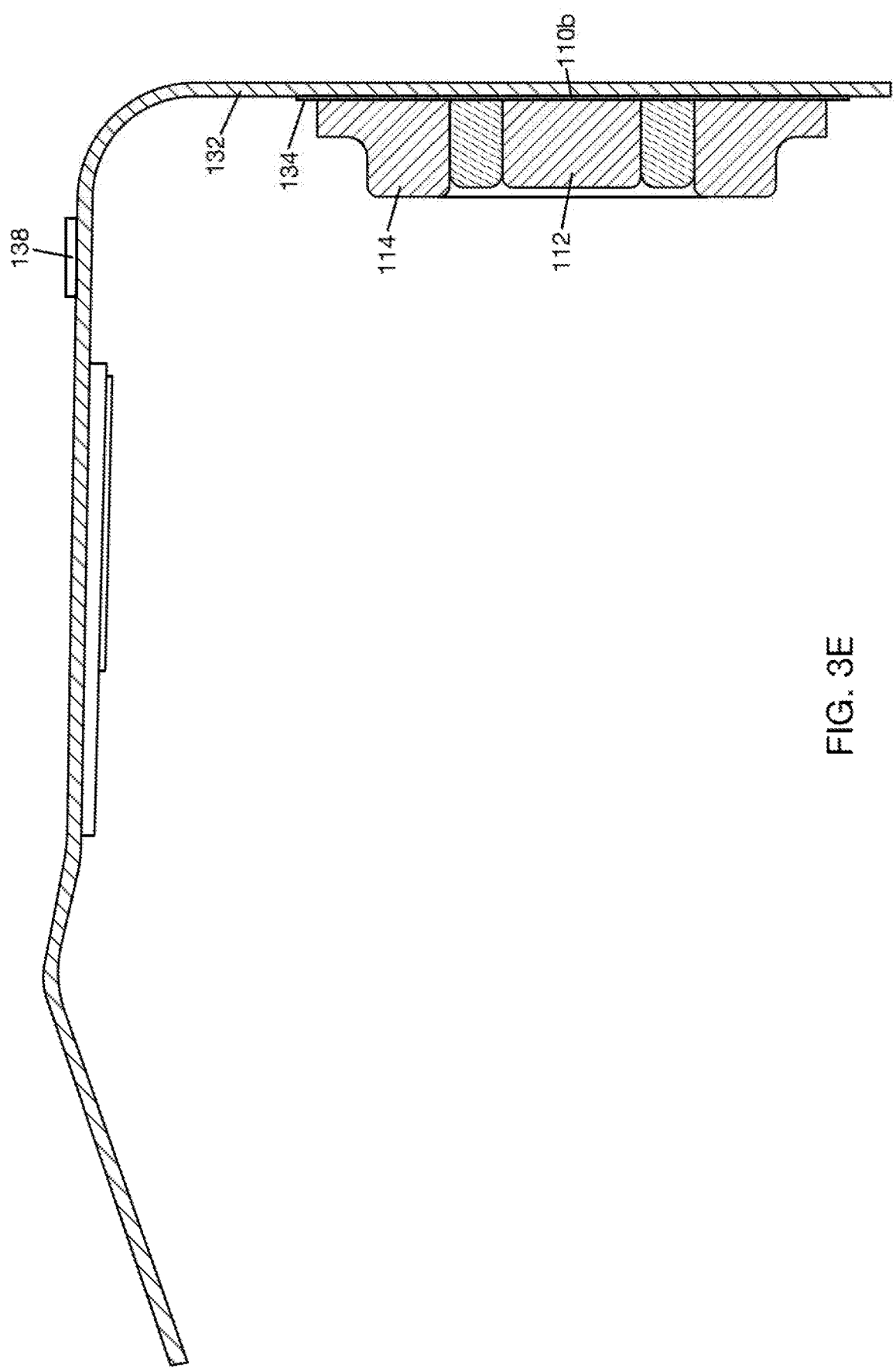
FIG. 3E is a cross-sectional view of the connector receptacle of FIG. 3A mounted on a connection board.

FIG. 3E shows connector receptacle 110 mounted on a connection board 132, which in one example is a flexible printed circuit board that can be conformed to the shape of electronic device body 102 (in FIG. 1). Contact between connector pin 112 and a conductive trace in the connection board 132 and contact between magnetic ground return 114 and a ground plane of connection board 132 are established through a pressure-sensitive adhesive layer 134 between the back receptacle end 110b and the connection board 132. The pressure-sensitive adhesive layer 134 enables interconnection through the Z axis, i.e., through the thickness of the adhesive layer 134. Connection board 132 has two copper pads 138 (only one copper pad is visible in the drawing) that are connected to the conductive trace and ground plane of connection board 132. A battery (not shown) can be placed in contact with the copper pads to allow charging of the battery through connector receptacle 110.

Figure 4A:
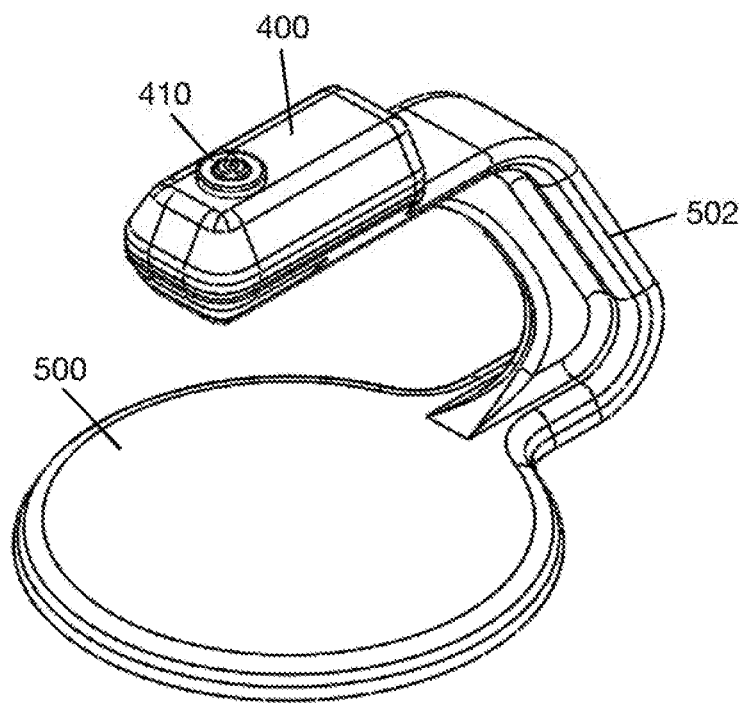
FIG. 4A is a perspective view of a dongle on a stand.
Figure 4B:
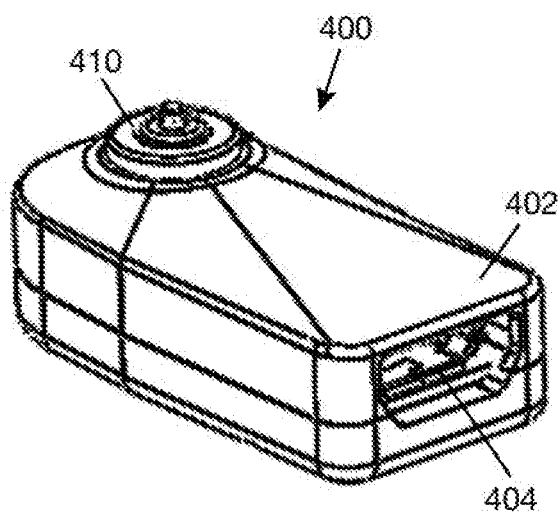
FIG. 4B is a rear perspective view the dongle of FIG. 4A.
Figure 4C:
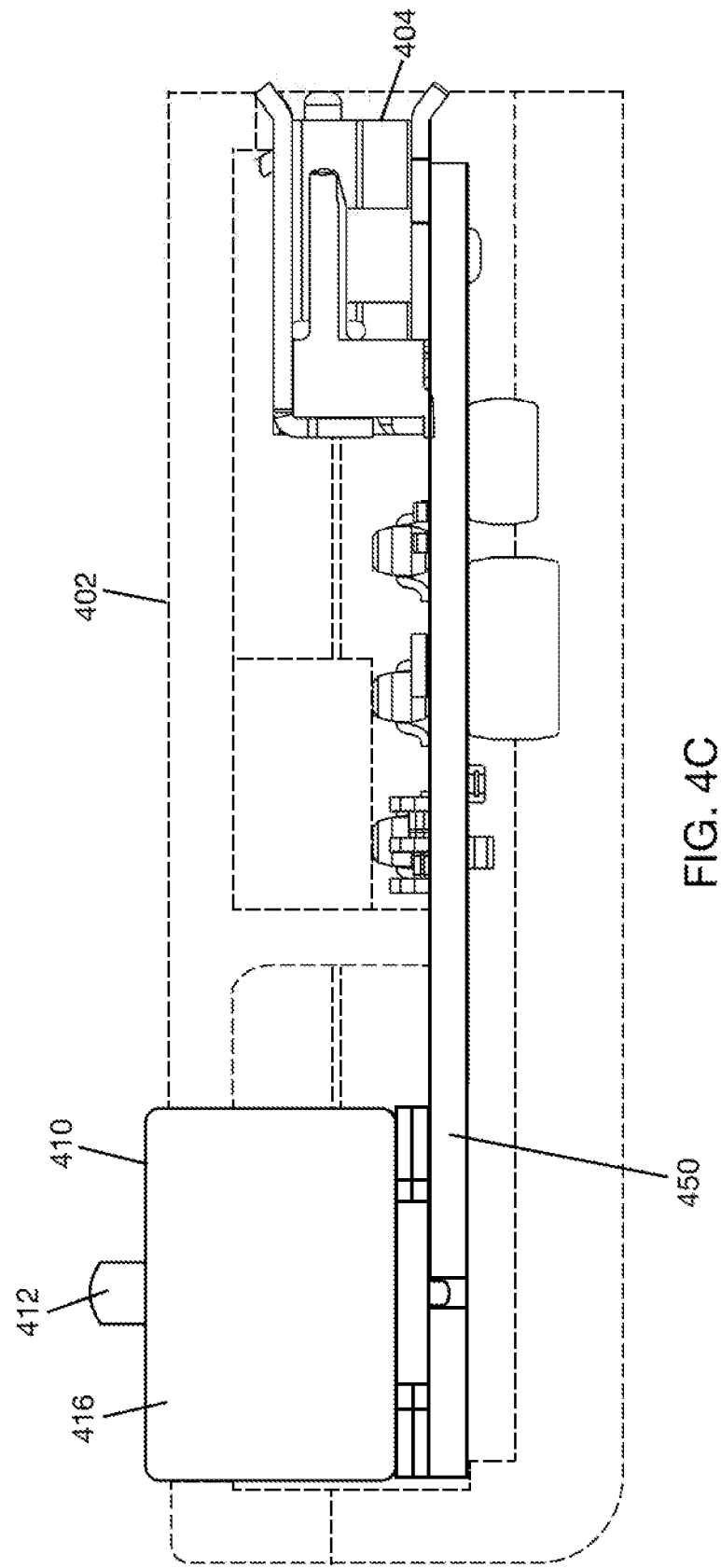
FIG. 4C is a partially transparent side elevational view that shows a connector insert in the dongle of FIG. 4A.

FIG. 4A shows a dongle 400 coupled to an arm 502 of a stand 500. FIG. 4B shows a rear view of dongle 400. Dongle 400 includes a connector insert 410 that may mate with connector receptacle 110 (in FIGS. 1 and 3A-3C). As shown in FIG. 4B, dongle 400 has a housing 402 with a receiving portion (or connection port) 404. Connection port 404 can be configured to receive any mechanism for transmitting power and/or data to and from dongle 400. For example, connection port 404 may be a USB connector receptacle to receive a USB connector. As shown in FIG. 4C, connector insert 410 is partially disposed in housing 402 and is electrically coupled to connection port 404 by a connection board 450. Connection board 450 includes conductive trace(s) and ground plane for electrical connection. Dongle 400 may act as an intermediate between a power provider such as a wall outlet or other power source (not shown) or a data provider/recipient (not shown) and electronic device 100. In one embodiment, dongle 400 may provide power from a source of power such as, but not limited to, a wall outlet, an electronic device, or other power source to electronic device 100 and transform this received power to a form that may be used to charge battery (not shown) in electronic device 100.

Figure 5A:
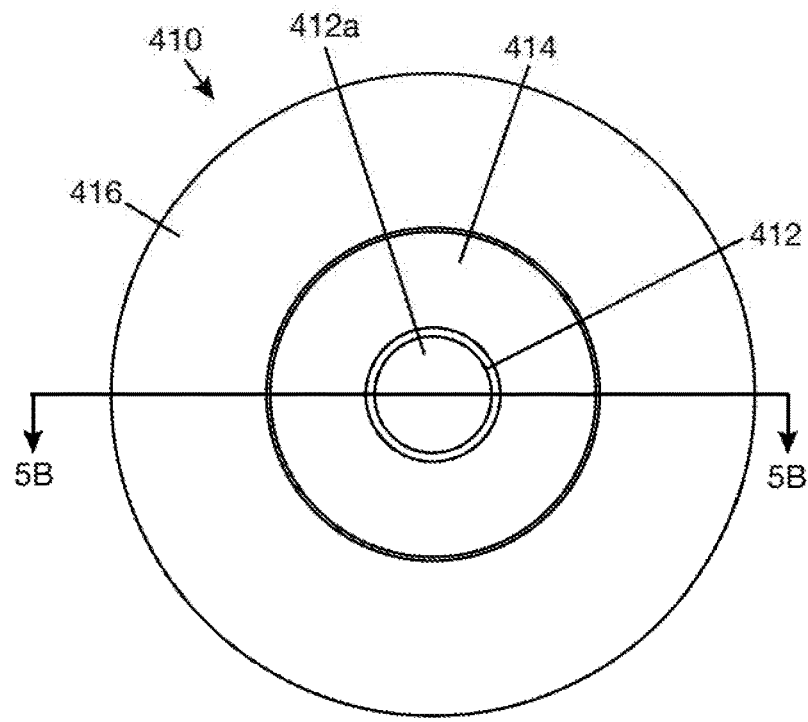
FIG. 5A is a front plan view of the connector insert of FIGS. 4A-4C.
Figure 5B:
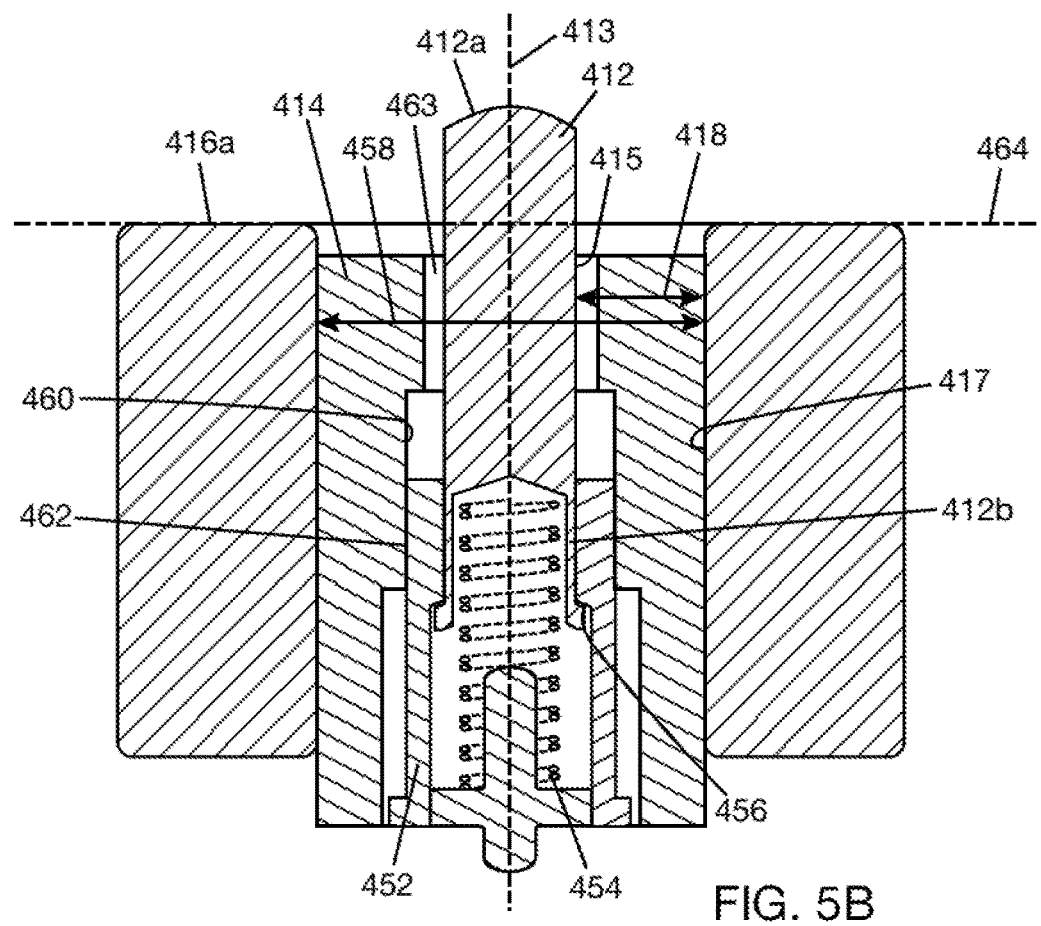
FIG. 5B is a cross-sectional view of the connector insert of FIG. 5A along line 5B-5B.

Referring to FIGS. 5A and 5B, connector insert 410 includes a power contact 412 made of a conductive material, such as brass, a copper-nickel-silicon alloy, a silver alloy, or the like. Power contact 412 has a contact end 412a to contact connector pin 112 (in FIGS. 3A-3C) when connector insert 410 mates with connector receptacle 110 (in FIGS. 1 and 3A-3C). In one example, contact end 412a may have a bullnose shape (in FIG. 5B). In other examples, contact end 412a may have a tapered shape or may be flat. A lower end portion 412b of power contact 412 is received in a spring housing 452. Spring housing 452 contains a spring 454, which is arranged to apply an outwardly biasing force to lower end portion 412b of power contact 412, i.e., power contact 412 is spring loaded. Power contact 412 slides relative to spring housing 452 in response to deformation of spring 454, where the sliding motion is limited by a stop surface 456 in spring housing 452.

Power contact 412 and spring housing 452 are disposed within a central opening 458 of a magnetic sleeve 416. Magnetic sleeve 416 may be made of an electrically conductive material, such as described above for the magnetic ground return 116 (in FIGS. 3A-3C). In some examples, the electrical conductivity of the magnetic sleeve 416 may be selected to be lower than the electrical conductivity of the power contact 412. Magnetic sleeve 416 may be a magnet or may be made of a ferromagnetic material, such as low carbon steel, stainless steel, or the like. Magnetic sleeve 416 has a magnetic sleeve front face 416a to magnetically latch onto the front ground return face 116a (in FIGS. 3A and 3C) of connector receptacle 110 (in FIGS. 3A-3C). An inner wall 417 of magnetic sleeve 416 is separated from an outer wall 415 of power contact 412 by an annular gap 418. An insulator 414 is disposed in annular gap 418 to electrically isolate power contact 412 from magnetic sleeve 416. Insulator 414 may be a non-conductive material, such as described above for insulator 114 (in FIGS. 3A-3C). Alternatively, insulator 414 may be air. Insulator 414 has a bore 460 to receive spring housing 452 and power contact 412. Insulator 414 may engage both inner wall 417 of magnetic sleeve 416 and an outer wall 462 of spring housing 452. There may be an annular gap 463 between power contact 412 and insulator 414 to allow sliding movement of power contact 412 relative to insulator 414 in response to deformation of spring 454.

In one implementation, at a contact plane 464 of connector insert 410 including magnetic sleeve front face 416a, connector insert 410 may be described as rotationally (or radially) symmetric. In general, rotational symmetry on contact plane 464 includes magnetic sleeve 416 with an annular geometry at contact plane 464 and power contact 412 with a circular geometry at contact plane 464, where the annular and circular geometries are concentric. In general, rotational symmetry may also mean that power contact 412 is coaxial with magnetic sleeve 416, i.e., power contact 412 and magnetic sleeve 416 share a common axial axis 413 (in FIG. 5B). Rotationally symmetric connector insert 410 can mate with rotationally symmetric connector receptacle 110 (in FIGS. 3A-3C) at any rotational offset between contact plane 464 of connector insert and contact plane 164 (in FIGS. 3C and 3D) of the connector receptacle.

Figure 6:
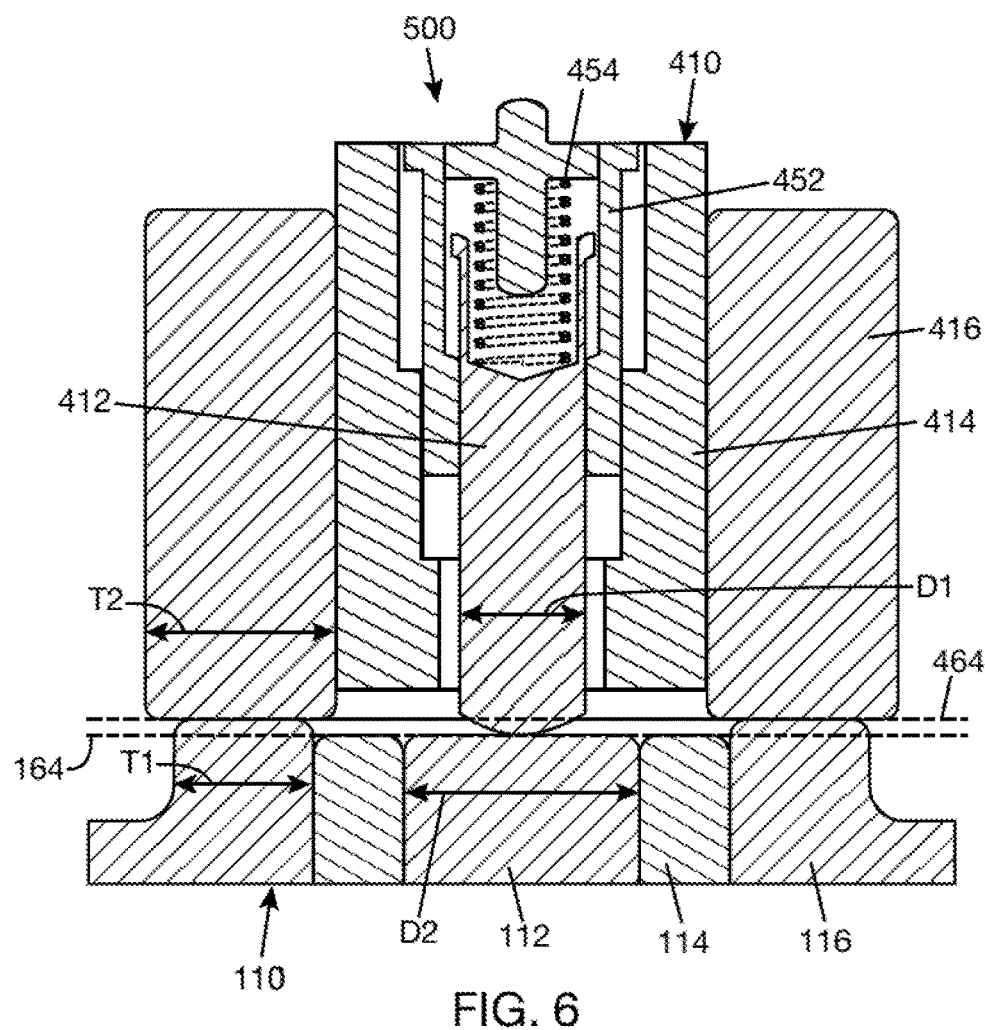
FIG. 6 is a cross-sectional view of a magnetic connector system including the connector receptacle of FIGS. 3A-3C and the connector insert of FIGS. 5A and 5B.

FIG. 6 shows a magnetic connector system 500 including connector receptacle 110 and connector insert 410. A power and/or data connection is made when contact plane 464 of connector insert 410 is brought into opposing relation with contact plane 164 of connector receptacle 110 and magnetic ground return 116 is within an attraction distance of magnetic sleeve 416, causing magnetic sleeve 416 of connector insert 410 to magnetically latch onto magnetic ground return 116 of connector receptacle 110. In this position, power contact 412 of connector insert 410 makes contact with connector pin 112 of connector receptacle 110, and spring 454 biases power contact 412 of connector insert 410 against connector pin 112 of connector receptacle 110. In connection system 500, a diameter D1 of power contact 412 at contact plane 464 may be selected to be smaller than a diameter D2 of connecting pin 112 at contact plane 164. Also, a radial thickness T1 of magnetic sleeve 416 at contact plane 464 may be selected to be larger than a radial thickness T2 of magnetic ground return 116 at contact plane 164. (Although not shown, connector pin 112 may be spring loaded. This may be in addition to spring loading power contact 412 or instead of spring loading power contact 412.)

Figure 7:
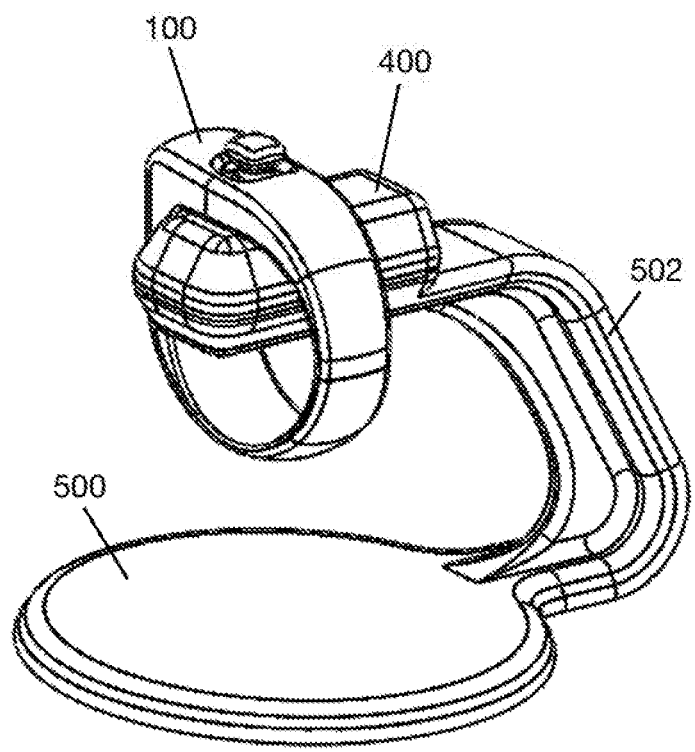
FIG. 7 is a perspective view of an electronic device with a connector receptacle mounted on a dongle with a connector insert.

FIG. 7 shows electronic device 100 mounted on dongle 400, with a power and/or data connection formed between electronic device 100 and dongle 400 via the connector receptacle on electronic device 100 and the connector insert on dongle 400 (see the connection system 500 in FIG. 6). An external cable can be inserted in the receiving port (404 in FIG. 4B) of dongle 400 to provide power and/or data to electronic device 100 through dongle 400. In the arrangement shown in FIG. 7, electronic device 100 hangs on dongle 400—this may allow gravity to further assist in maintaining contact between the connector insert (110 in FIG. 1) on electronic device 100 and the connection receptacle (410 in FIG. 4B) on dongle 400.

Figure 5C:
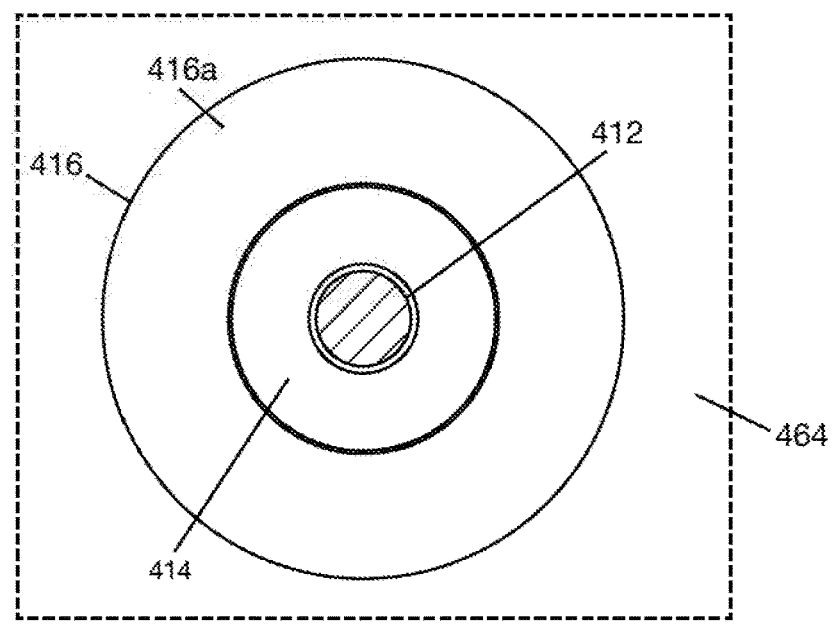
FIG. 5C is a cross-sectional view of the connector insert of FIG. 5B along plane 464.

In other implementations, connector receptacle 410 (in FIGS. 5A-5C) may be formed at an end of a power adapter. In other implementations, the connection system 500 shown in FIG. 6 may be used with a variety of electronic devices, such as, but not limited to, portable computing devices, tablets, desktop computers, smart phones, storage devices, portable media players, navigation systems, monitors and other like devices, may also be charged.

Figure 8A:
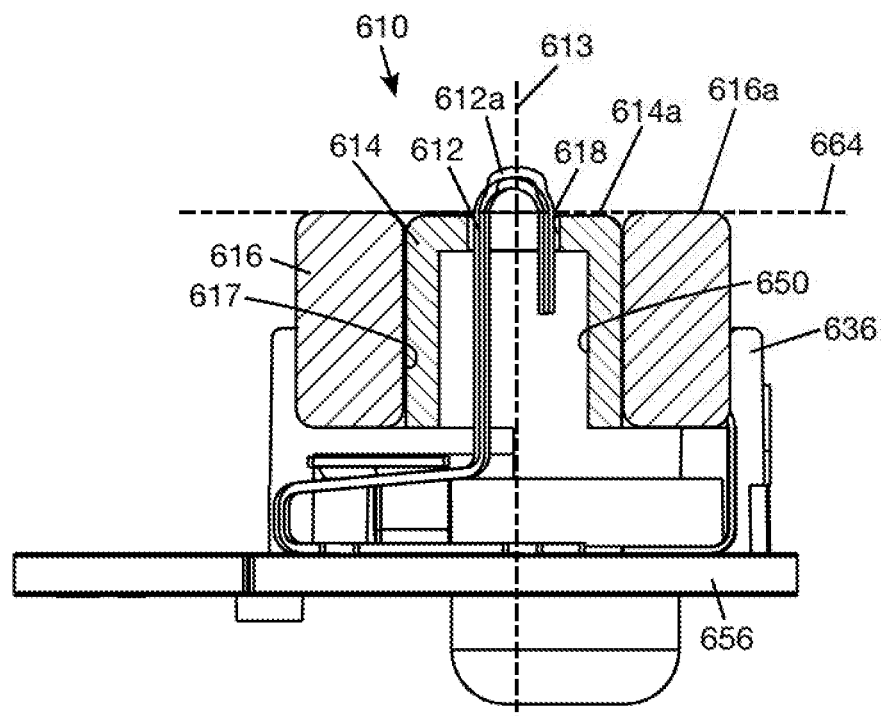
FIG. 8A is a cross-sectional view of a connector insert according to another implementation.

FIG. 8A shows another example of a connector insert 610 that may mate with connector receptacle (110 in FIGS. 3A-3C) in a magnetic connector system. Connector insert 610 includes a power contact 612 made of an electrically conductive material, such as brass, a copper-nickel-silicon alloy, a silver alloy, or the like. In one example, power contact 612 is a flat spring, e.g., made of a flat strip of electrically conductive material. One end of the power contact 612 is curved or bent to form a spring contact end 612a. The other end of power contact 612 may be attached to a connection board 656 that is positioned at the back end of connector insert 610. Power contact 612 is received within a bore 650 of an insulator 614, with spring contact end 612a protruding through an opening 618 at a front end 614a of insulator 614. Insulator 614 may be made of an electrically non-conductive material, such as described above for insulator 414 (in FIGS. 5A and 5B), and/or a surface of insulator 614 defining opening 618 may be made of an electrically non-conductive material. Insulator 614 is received within a central opening 617 of a magnetic sleeve 616. Magnetic sleeve 616 may be made of an electrically conductive material, such as described above for the magnetic ground return 116 (in FIGS. 3A-3C). In some examples, the electrical conductivity of the magnetic sleeve 616 may be selected to be lower than the electrical conductivity of the power contact 612. Magnetic sleeve 616 may be a magnet or may be made of a ferromagnetic material. Insulator 614 may be in the form of a support rod on which magnetic sleeve 616 is mounted. Insulator 614 is between power contact 612 and magnetic sleeve 616 and electrically isolates power contact 612 from magnetic sleeve 616.

Insulator 614 and magnetic sleeve 616 are coaxial, i.e., share a common axial axis 613. The opening 618 in insulator 614, which constrains power contact 612, is also coaxial with magnetic sleeve 616. At a contact plane 664 of connector insert 610 including a front magnetic sleeve face 616a of magnetic sleeve (and proximate front end 614a of insulator 614), connector insert 610 may be described as rotationally (or radially) symmetric. In general, rotational symmetry on contact plane 664 includes magnetic sleeve 616 with an annular geometry and power contact 412 centrally located within this annular geometry.

Figure 8B:
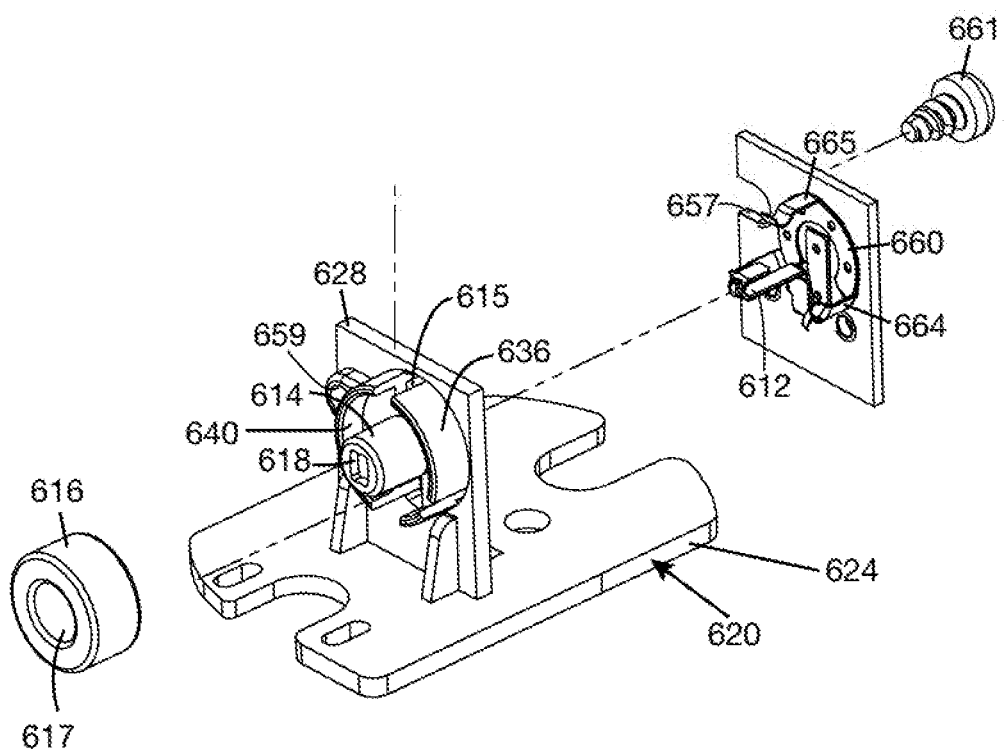
FIG. 8B is an exploded view of the connector insert of FIG. 8A.
Figure 8C:
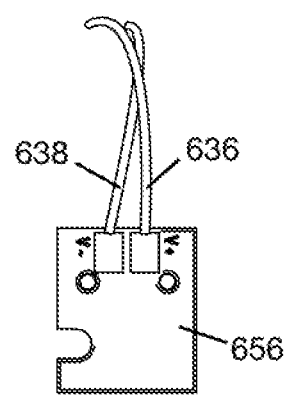
FIG. 8C is a rear side view of a connection board arranged at a back side of the connector insert of FIG. 8A.

Referring to FIG. 8B, connection board 656 carries a circular bracket 660 with circumferentially arranged spring tabs 665. Wires 636, 638 (in FIG. 8C) are soldered to a backside of connection board 656. Wire 636 is connected to a conductive trace in connection board 656, and wire 638 is connected to a ground plane of connection board 656. The end of power contact 612 attached to connection board 656 is connected to the conductive trace in connection board 656 and in communication with wire 636. Bracket 660 is connected to the ground plane of connection board 656 and in communication with wire 638. Wires 636, 638 may be connected to terminals of a power and/or data source to provide power and/or data to power contact 612.

Referring to FIGS. 8A and 8B, connector insert 610 may be supported on a chassis 620. In one example, chassis 620 has a base plate 624 and a vertical support 628 mounted on base plate 624. Connection board 656 is mounted to a rear side of vertical support 628. A slot 657 (in FIG. 8B) at a side of connection board 656 is aligned with a hole 659 on vertical support 628. A screw 661 having a head larger than slot 657 is inserted through slot 657 and thread into hole 659 (in FIG. 8B) to establish firm contact between connection board 656 and the backside of vertical support 228. Vertical support 628 has an opening that is aligned with the bore 650 (in FIG. 8A) of insulator 614, allowing power contact 612 on connection board 656 to be inserted into bore 650 of insulator 614 from the backside of vertical support 628.

Insulator 614 is mounted to a front side of vertical support 628. An outer sleeve 636 is also mounted to a front side of vertical support 228. Outer sleeve 636 circumscribes insulator 614 and is coaxial with insulator 614. Magnetic sleeve 616 is arranged in an annular space 640 (in FIG. 8B) between outer sleeve 636 and insulator 614. Outer sleeve 636 includes longitudinal slits 615 (in FIG. 8B) that receive spring tabs 665 on connection board 656. Spring tabs 665 move out of the way to accommodate magnetic sleeve 614 and apply a force to clamp magnetic sleeve 616 to insulator 614. This effectively couples magnetic sleeve 616 to the ground plane of connection board 256, allowing magnetic sleeve 616 to serve as ground contact.

Figure 8D:
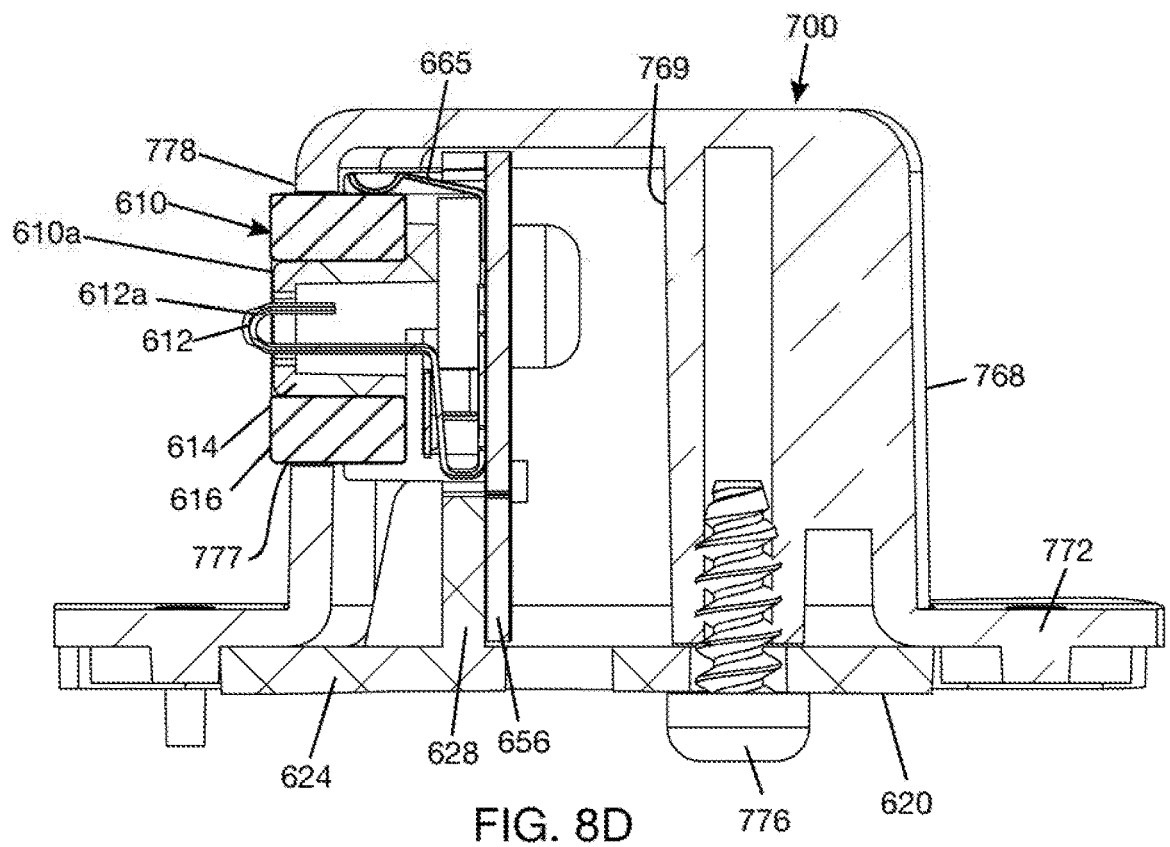
FIG. 8D is a connector assembly including the connector insert of FIG. 8A.

FIG. 8D shows a connector assembly 700 including connector insert 610. In addition to connector insert 610, connector assembly 700 includes a cap 768 having a flange 772. Cap 768 is generally in the form of a cylindrical body having a cavity 769 to receive vertical support 628 and components coupled to vertical support 628. Base plate 624 of chassis 620 is shown abutting the bottom end of cap 668. Base plate 624 may be attached to cap 768 by, for example, a screw 776 that is inserted into aligned holes in base plate 624 and cap 656. A side wall 778 of cap 768 includes an opening 777. When vertical support 628 is received inside cap 668, the front end 610a of connector insert 610 passes through opening 777 and protrudes from side wall 778. Electronic device 100 (in FIG. 1) can be mounted over cap 768, with the front end 110a (in FIG. 3A) of connector receptacle 110 (in FIG. 1) in opposing relation to and mating with the front end 610a of connector insert 610.

Figure 9:
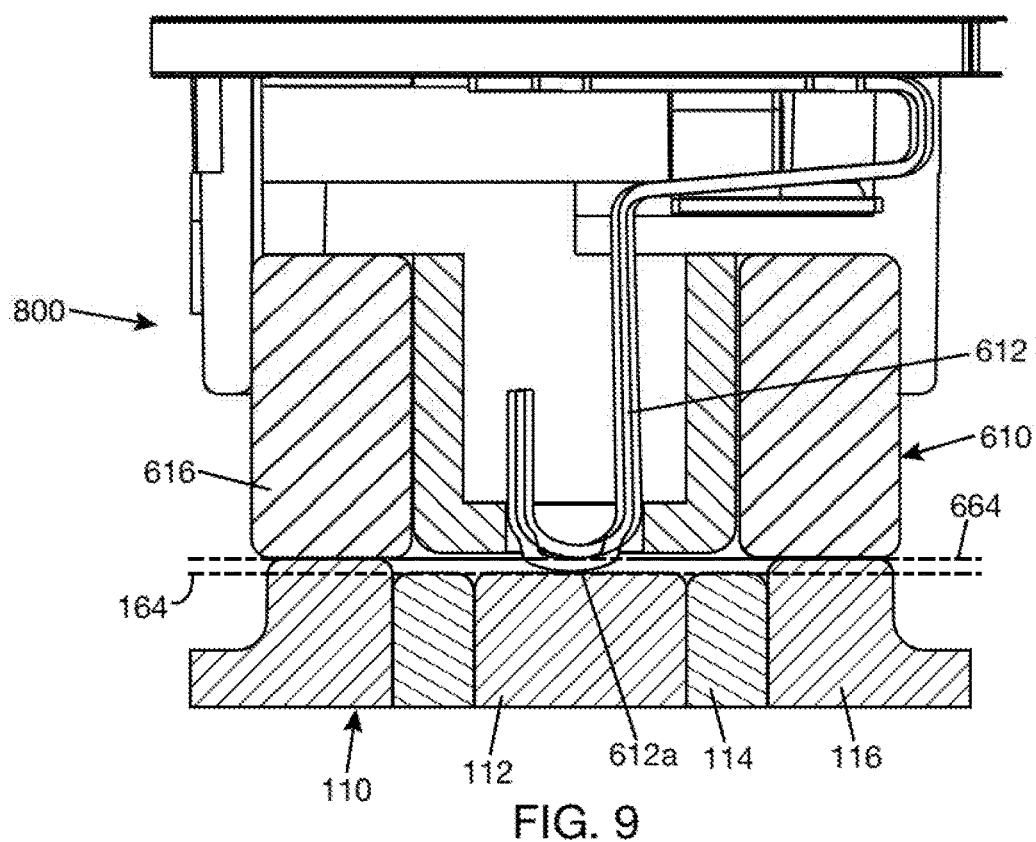
FIG. 9 is a cross-sectional view of a magnetic connector system including the connector receptacle of FIGS. 3A-3C and the connector insert of FIGS. 8A and 8B.

FIG. 9 shows a magnetic connector system 800 including connector receptacle 110 and connector insert 610. A power and/or data connection is made when contact plane 664 of connector insert 610 is brought into opposing relation with contact plane 164 of connector receptacle 110 and magnetic ground return 116 is within an attraction distance of magnetic sleeve 616, causing magnetic sleeve 616 of connector insert 610 to magnetically latch onto magnetic ground return 116 of connector receptacle 610. In this position, power contact 612 of connector insert 610 makes contact with connector pin 112 of connector receptacle 110. The spring nature of power contact 612 will allow power contact 612 to deflect as the contact is made.

This application incorporates by reference the teachings of U.S. Provisional Application No. 62/608,385 ("Magnetic Connector for a Wearable Ring") filed on 20 Dec. 2017, and U.S. Provisional Application No. 62/734,792 ("Charger Case for Wearable Electronics") filed on 21 Sep. 2018, in their entirety.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A magnetic connector system, comprising:
a connector receptacle having a first contact plane, the connector receptacle comprising:
a connector pin that is electrically conductive, the connector pin having a first pin face on the first contact plane, a second pin face in opposing relation to the first pin face, and an outer wall that extends between the first pin face and the second pin face; and
a magnetic ground return that is electrically conductive, the magnetic ground return in coaxial arrangement with the connector pin, the magnetic ground return having a first ground return face, a second ground return face in opposing relation to the first ground return face, and an inner wall that extends between the first ground return face and the second ground return face, the inner wall of the magnetic ground return radially opposed to and spaced apart from the outer wall of the connector pin by a first annular gap;
a connector insert having a second contact plane, the connector insert comprising:
a magnetic sleeve that is electrically conductive, the magnetic sleeve having an end face on the second contact plane and a central opening, the end face of the magnetic sleeve to magnetically latch onto the first ground return face when the second contact plane is positioned in opposing relation to the first contact plane; and
a power contact received in the central opening of the magnetic sleeve, the power contact in coaxial arrangement with the magnetic sleeve and separated from the magnetic sleeve by a second annular gap, the power contact having a contact end to contact the first pin face of the connector pin when the end face of the magnetic sleeve is magnetically latched onto the first ground return face.

2. The magnetic connector system of claim 1, wherein the first pin face has a circular geometry at the first contact plane, wherein the first ground return face has an annular geometry at the first contact plane, and wherein the circular geometry of the first pin face and the annular geometry of the first ground return face are concentric.

3. The magnetic connector system of claim 1, wherein the connector receptacle is rotationally symmetric at the first contact plane, and wherein the connector insert is rotationally symmetric at the second contact plane.

4. The magnetic connector system of claim 1, further comprising an electrical insulator disposed in the first annular gap between the connector pin and the magnetic ground return.

5. The magnetic connector system of claim 4, wherein the electrical insulator is a conformable material that conformably engages both the inner wall of the magnetic ground return and the outer wall of the connector pin.

6. The magnetic connector system of claim 1, wherein the magnetic ground return comprises a ferromagnetic material or is a magnet.

7. The magnetic connector system of claim 1, wherein the contact end of the power contact has a bullnose shape.

8. The magnetic connector system of claim 1, wherein a diameter of the power contact at the second contact plane is smaller than a diameter of the connector pin at the first contact plane.

9. The magnetic connector system of claim 1, further comprising an electrical insulator disposed in the second annular gap between the magnetic sleeve and the power contact.

10. The magnetic connector system of claim 1, further comprising a spring arranged to apply a biasing force to the power contact, the biasing force to maintain contact between the contact end and the first pin face when the end face of the magnetic sleeve is magnetically latched onto the first ground return face.

11. The magnetic connector system of claim 1, wherein the first pin face is recessed relative to the first ground return face at an end of the connector receptacle proximate the first contact plane.

12. The magnetic connector system of claim 1, wherein the power contact has a circular geometry at the second contact plane, wherein the magnetic sleeve has an annular geometry at the second contact plane, and wherein the circular geometry and annular geometry are concentric.

13. The magnetic connector system of claim 1, wherein the magnetic sleeve comprises a ferromagnetic material or is a magnet.

14. The magnetic connector system of claim 1, further comprising a dongle having a dongle housing, wherein the connector insert is partially disposed in the dongle housing, and wherein the end face of the magnetic sleeve and the contact end of the power contact are exposed at an outer surface of the dongle housing.

15. The magnetic connector system of claim 14, wherein the dongle housing comprises a connection port dimensioned to receive a connector, and wherein the connector insert is electrically coupled to the connection port.

16. The magnetic connector system of claim 15, further comprising a stand having an arm, wherein the dongle housing is supported on the arm of the stand.

17. A connector insert to mate with a connector receptacle of an electronic device, the connector insert comprising:
- a magnetic sleeve that is electrically conductive, the magnetic sleeve having an end face at a contact plane and a central opening, the end face of the magnetic sleeve to magnetically latch onto a magnetic ground return of the connector receptacle when the contact plane including the end face of the magnetic sleeve is positioned in opposing relation to a contact plane of the connector receptacle; and
- a power contact received in the central opening of the magnetic sleeve, the power contact in coaxial arrangement with the magnetic sleeve and separated from the magnetic sleeve by an annular gap, the power contact having a contact end to contact a connector pin of the connector receptacle when the end face of the magnetic sleeve is magnetically latched onto the magnetic ground return of the connector receptacle.

18. The connector insert of claim 17, which is rotationally symmetric at the contact plane.

19. The connector insert of claim 17, wherein the contact end has a bullnose shape.

20. The connector insert of claim 17, further comprising an electrical insulator disposed in the annular gap between the power contact and the magnetic sleeve.

21. The connector insert of claim 17, further comprising a spring arranged to apply a biasing force to the power contact, the biasing force to maintain contact between the contact end and the connector pin when the connector insert is mated with the connector receptacle.

22. The connector insert of claim 17, wherein the magnetic sleeve comprises a ferromagnetic material or is a magnet.

23. The connector insert of claim 17, which is attached to a dongle.

* * * * *